(12) United States Patent
Aso et al.

(10) Patent No.: US 12,420,604 B2
(45) Date of Patent: Sep. 23, 2025

(54) VEHICLE

(71) Applicant: ISUZU MOTORS LIMITED, Tokyo (JP)

(72) Inventors: Mitsuhiro Aso, Fujisawa (JP); Kenichi Horiguchi, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 18/693,184

(22) PCT Filed: Sep. 22, 2022

(86) PCT No.: PCT/JP2022/035474
§ 371 (c)(1),
(2) Date: Oct. 21, 2024

(87) PCT Pub. No.: WO2023/048257
PCT Pub. Date: Mar. 30, 2023

(65) Prior Publication Data
US 2025/0050696 A1     Feb. 13, 2025

(30) Foreign Application Priority Data
Sep. 27, 2021   (JP) .................. 2021-156700

(51) Int. Cl.
*B60G 3/06*      (2006.01)

(52) U.S. Cl.
CPC ............ *B60G 3/06* (2013.01); *B60G 2200/13* (2013.01); *B60G 2204/1244* (2013.01);
(Continued)

(58) Field of Classification Search
CPC .................. B60G 3/06; B60G 2200/13; B60G 2204/1244; B60G 2204/143;
(Continued)

(56) References Cited

U.S. PATENT DOCUMENTS 3,520,548 A * 7/1970 Mcgee ............... B60G 17/052
                                                     280/681
4,768,601 A   9/1988 Okano
(Continued)

FOREIGN PATENT DOCUMENTS

DE    102018217345 A1    3/2020
EP      1985474 A2      10/2008
(Continued)

OTHER PUBLICATIONS

International Search Report from International Application No. PCT/JP2022/035474 mailed Nov. 8, 2022.

*Primary Examiner* — Paul N Dickson
*Assistant Examiner* — Matthew D Lee
(74) *Attorney, Agent, or Firm* — Shih IP Law Group, PLLC (57) ABSTRACT

Provided is a vehicle with a cargo room provided on a vehicle body frame, the vehicle comprising: drive motors respectively provided for each of a pair of first rear wheels 50 and a pair of second rear wheels 55 disposed at a predetermined interval in the front-rear direction of the vehicle, the drive motors rotating the first rear wheels 50 and second rear wheels 55 independently; and a pair of suspension mechanisms 100 supporting a first axle of the first rear wheels 50 and a second axle of the second rear wheels 55. The suspension mechanism 100 includes: a first arm 110 which is coupled to the first axle of the first rear wheels 50 and the longitudinal direction of which extends in the front-rear direction; a second arm 115 which is coupled to the second axle of the second rear wheels 55 and the longitudinal direction of which extends in the front-rear direction; a support shaft 120 that causes one end of the first arm 110 in the longitudinal direction and one end of the second arm 115 in the longitudinal direction to be rotatably supported with respect to the vehicle body frame; a first
(Continued)

FRONT-REAR DIRECTION spring member 130 provided between the other end of the first arm 110 in the longitudinal direction and the vehicle body; and a second spring member 135 provided between the other end of the second arm 115 in the longitudinal direction and the vehicle body.

9 Claims, 5 Drawing Sheets

(52) U.S. Cl.
CPC .. *B60G 2204/129* (2013.01); *B60G 2204/143* (2013.01); *B60G 2300/026* (2013.01); *B60G 2300/50* (2013.01)

(58) Field of Classification Search
CPC ........ B60G 2204/129; B60G 2300/026; B60G 2300/50; B60G 5/06; B60K 1/04
See application file for complete search history.

(56) References Cited

U.S. PATENT DOCUMENTS

| | | |
|---|---|---|
| 7,357,402 B2 | 4/2008 | Berghus et al. |
| 8,851,500 B2 | 10/2014 | Dobbelaar |
| 11,433,724 B2 | 9/2022 | Bifano et al. |
| 11,718,133 B2 | 8/2023 | Kirsch et al. |
| 2004/0232646 A1* | 11/2004 | Peters ................... B60G 7/02 280/124.132 |
| 2005/0275185 A1 | 12/2005 | Peters |
| 2006/0290090 A1 | 12/2006 | Leden |
| 2007/0102210 A1 | 5/2007 | Oshidari |
| 2014/0145414 A1 | 5/2014 | Dobbelaar |
| 2020/0282789 A1* | 9/2020 | Hallundbæk ............ B60G 3/20 |
| 2022/0048347 A1 | 2/2022 | Bifano |
| 2022/0194489 A1* | 6/2022 | Roche ................... B60K 17/22 |
| 2023/0331052 A1 | 10/2023 | Swenson et al. |

FOREIGN PATENT DOCUMENTS

| | | |
|---|---|---|
| JP | S60-038804 U | 3/1985 |
| JP | S62-283073 A | 12/1987 |
| JP | S63-207706 A | 8/1988 |
| JP | H11-115507 A | 4/1999 |
| JP | 2002-178734 A | 6/2002 |
| JP | 2007-131160 A | 5/2007 |
| JP | 2008-537523 A | 9/2008 |
| JP | 2014-512298 A | 5/2014 |
| JP | 2019-048504 A | 3/2019 |
| JP | 2020-050160 A | 4/2020 |
| JP | 2021-041896 A | 3/2021 |

* cited by examiner

VEHICLE WIDTH DIRECTION

VEHICLE

CROSS-REFERENCE TO RELATED APPLICATIONS

The present application is a U.S. National Stage entry of PCT Application number PCT/JP2022/035474, filed on Sep. 22, 2022, which claims priority under 35 U.S.C § 119 (a) to Japanese Patent Application No. 2021-156700, filed on Sep. 27, 2021, contents of which are incorporated herein by reference in their entirety.

TECHNICAL FIELD

The present invention relates to a vehicle in which a load chamber is provided on a vehicle body frame.

BACKGROUND OF THE INVENTION

In vehicles such as trucks, a vehicle in which a drive wheel is independently rotated with an electric motor has been proposed (see Patent Document 1). This vehicle includes a suspension mechanism for reducing impacts during traveling.

PRIOR ART

Patent Document

[Patent Document 1]: Japanese Unexamined Patent Application Publication No. 2021-41896

BRIEF DESCRIPTION OF THE INVENTION

Problem to be Solved by the Invention

From the perspective of ease of getting on and off a load chamber of a vehicle and similar considerations, there is a need for low flooring (low floor technology) in the load chamber. However, low flooring in the load chamber was difficult to achieve in vehicles with a high gross vehicle weight on which a load chamber is provided on a vehicle body frame, because an axle type suspension is adopted in such vehicles in order to support heavy loads.

The present invention focuses on this point, and its object is to realize low flooring in a load chamber of a vehicle with a high gross vehicle weight.

Means for Solving the Problem

One aspect of the present invention provides a vehicle in which a load chamber is provided on a vehicle body frame, the vehicle including: a drive motor that is provided for each of first rear wheels in a pair and second rear wheels, disposed having a predetermined interval therebetween in a front-rear direction of the vehicle, and rotates the first rear wheels and the second rear wheels independently; and a pair of suspension mechanisms that support a first axle of the first rear wheels and a second axle of the second rear wheels, wherein each suspension mechanism includes: a first arm part, connected to the first axle of the first rear wheel, whose longitudinal direction extends in the front-rear direction, a second arm part, connected to the second axle of the second rear wheel, whose longitudinal direction extends in the front-rear direction, a support shaft that supports one end of the first arm part in the longitudinal direction and one end of the second arm part in the longitudinal direction such that both of the one ends are pivotably supported with respect to the vehicle body frame, a first spring member provided between the other end of the first arm part in the longitudinal direction and a vehicle body, and a second spring member provided between the other end of the second arm part in the longitudinal direction and the vehicle body.

The first arm part and the second arm part may each pivot around the support shaft independently.

The first arm part and the second arm part may pivot around the support shaft integrally.

Further, a length of the first arm part in the longitudinal direction may be greater than a diameter of the first rear wheel, a length of the second arm part in the longitudinal direction may be greater than a diameter of the second rear wheel, and the first spring member and the second spring member may be coil springs disposed along a vertical direction.

The suspension mechanism may further include: a first damper part that bonds ends of the first spring member to the other end of the first arm part and the vehicle body, and a second damper part that bonds ends of the second spring member to the other end of the second arm part and the vehicle body.

Further, the vehicle may further include: a pair of first bearings that are provided on the one end of the first arm part, and support both ends of the support shaft; and a pair of second bearings that are provided on the one end of the second arm part, and support both ends of the support shaft.

Further, a floor surface of the load chamber may be lower than a center of the first rear wheel and the second rear wheel in the vertical direction and may be positioned between the pair of suspension mechanisms in the vehicle width direction.

Effect of the Invention

According to the present invention, it is possible to realize low flooring in a load chamber of a vehicle with a high gross vehicle weight.

DESCRIPTION OF EMBODIMENTS

<Outline of a Vehicle>

An outline of a vehicle according to an embodiment will be described with reference to FIG. 1.

Figure 1:
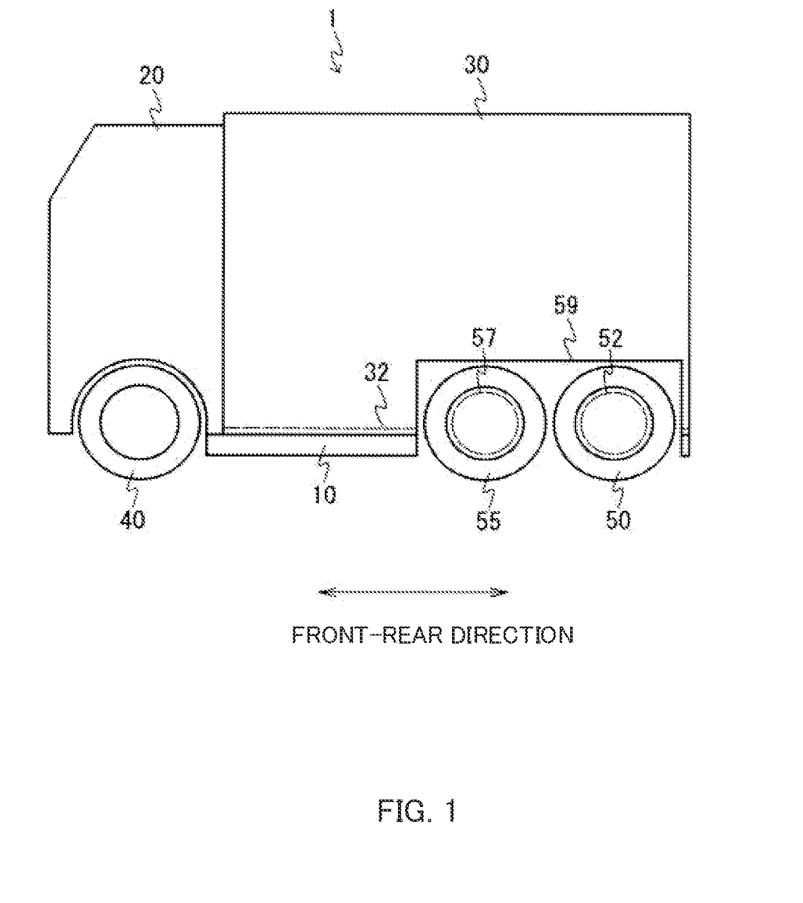
FIG. 1 is a schematic diagram illustrating an external configuration of a vehicle 1.

FIG. 1 is a schematic diagram illustrating an external configuration of a vehicle 1. The vehicle 1 is a truck, for example. The vehicle 1 is an electric vehicle driven by an electric motor. As shown in FIG. 1, the vehicle 1 includes a vehicle body frame 10, a cab 20, a load chamber 30, front wheels 40, first rear wheels 50, a first drive motor 52, second rear wheels 55, and a second drive motor 57.

The vehicle body frame 10 is a framework that supports the vehicle 1. The vehicle body frame 10 includes (i) a pair of side members extending in a front-rear direction of the vehicle 1 and (i) a cross member extending in a vehicle width direction in order to connect the pair of side frames. The vehicle body frame 10 is positioned lower than the center of the first rear wheels 50 and the second rear wheels 55 in a vertical direction, to realize low flooring in the load chamber 30.

The cab 20 is provided on the vehicle body frame 10. Inside the cab 20, a cabin is formed where an occupant such as a driver sits. A communication opening that communicates with the load chamber 30 may be formed on the rear side of the cab 20, and in this case, the driver can move from the cab 20 to the load chamber 30.

The load chamber 30 is provided on the vehicle body frame 10 and is positioned behind the cab 20. The load chamber 30 is formed in a box shape and has a space where goods are accommodated inside the load chamber 30, for example.

The front wheels 40 are front wheels of the vehicle 1, and are a pair of wheels connected to the left side and the right side of a vehicle body. The front wheels 40 are non-drive wheels in the present embodiment, and are steered by the driver operating a steering wheel.

The first rear wheels 50 are rear wheels of the vehicle 1, and are a pair of wheels connected to the left side and the right side of the vehicle body. The first rear wheels 50 are drive wheels in the present embodiment, and are driven by the first drive motor 52. A first axle (rotation axle) of the first rear wheels 50 is supported by a suspension mechanism which will be described later.

The first drive motor 52 is provided for each of the first rear wheels 50 in the pair, and each drive motor rotates the corresponding first rear wheel 50 independently. The first drive motors 52 are respectively provided inside the first rear wheel 50 on the left (a first rear wheel 50L in FIG. 2) and inside the first rear wheel 50 on the right (a first rear wheel 50R in FIG. 2).

The second rear wheels 55 are disposed forward from the first rear wheels 50 by a predetermined distance, for a reason described later, and are a pair of wheels connected to the left side and the right side of the vehicle body. The second rear wheels 55 are drive wheels and are driven by the second drive motor 57. A second axle (rotation axle) of the second rear wheels 55 is also supported by the suspension mechanism described later.

The second drive motor 57 is provided for each of the second rear wheels 55 in the pair, and each drive motor rotates the corresponding second rear wheel 55 independently. The second drive motors 57 are respectively provided inside the second rear wheel 55 on the left (a second rear wheel 55L in FIG. 2) and inside the second rear wheel 55 on the right (a second rear wheel 55R in FIG. 2).

In the vehicle 1, a floor surface 32 of the load chamber 30 is lower than an upper surface 59 of a wheel housing of each of the first rear wheels 50 and the second rear wheels 55. In the present embodiment, the floor surface 32 is lower than the center of the first rear wheels 50 and the second rear wheels 55 in the vertical direction in order to realize low flooring in the load chamber 30, from the perspective of ease of getting on and off the load chamber 30 and similar considerations. By doing this, the occupant can get on and off the load chamber 30 in a single step.

With general tires, there is a limit to the load that can be supported by a single wheel, and so in cases where the permissible load for heavy vehicles such as trucks is insufficient, dual tires are used to distribute the load placed on a single wheel. However, when dual tires are used in the vehicle 1, the width of the floor surface 32 (specifically, a space between the left and right wheel housings of the rear wheels) becomes narrow, and the advantage of lowering the floor surface 32 cannot be utilized. Further, in a case where the vehicle 1 is a heavy vehicle such as a truck, it is desirable that a suspension mechanism that supports the axles of the first rear wheels 50 and the second rear wheels 52 be a mechanism that can withstand heavy loads. As a suspension capable of withstanding heavy loads, an axle type suspension is commonly adopted since it uses leaf springs having minimal trade-off between the spring constant and the stroke amount, but in such a configuration, the axle and the vehicle body frame 10 intersect with each other, and therefore the floor surface 32 of the load chamber 30 cannot be lowered.

In contrast, although details will be described later, low flooring in the load chamber 30 capable of withstanding heavy loads is realized in the present embodiment by employing an independent suspension. Further, since the first rear wheels 50 and the second rear wheels 55 are disposed in the front-rear direction in the present embodiment, the length of the wheel housing in the vehicle width direction can be reduced compared to a case where dual tires are used for the purpose of increasing the tire's permissible load, and a generous distance can be secured between the wheel housings. As a result, a carriage can pass between the wheel housings in the load chamber 30, for example, and workability improves.

<Configuration of a Suspension Mechanism>

As a suspension mechanism according to the present embodiment, a first embodiment and a second embodiment will be described.

First Embodiment

Figure 2:
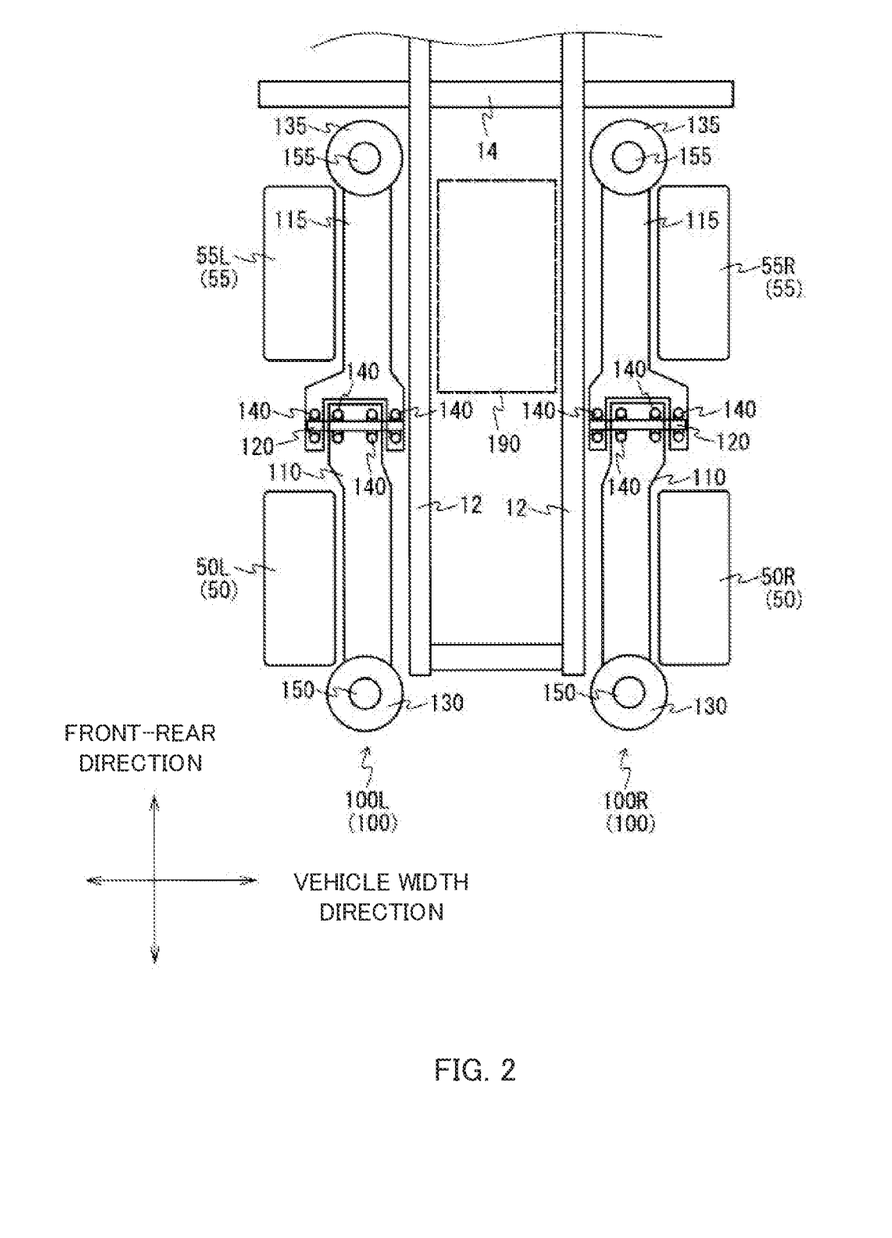
FIG. 2 is a schematic view for explaining a configuration of a suspension mechanism 100 according to a first embodiment.

FIG. 2 is a schematic view for explaining a configuration of a suspension mechanism 100 according to the first embodiment. As shown in FIG. 2, the suspension mechanism 100 includes a pair of suspension mechanisms that are (i) a suspension mechanism 100L for supporting the axles of the left rear wheel 50L and the second rear wheel 55L and (ii) a suspension mechanism 100R for supporting the axles of the right rear wheel 50R and the second rear wheel 55R. The suspension mechanism 100L and the suspension mechanism 100R are independent suspensions, and are disposed at positions not intersecting the vehicle body frame 10.

The vehicle body frame 10 includes a pair of side members 12 extending in the front-rear direction and a cross member 14 extending in the vehicle width direction.

The suspension mechanisms 100L and 100R are positioned on outer sides of the side members 12 in the vehicle width direction, respectively. The floor surface 32 of the load chamber 30 is positioned between the suspension mechanisms 100L and 100R in the vehicle width direction.

Since the suspension mechanism 100L and the suspension mechanism 100R have the same configuration, the suspension mechanism 100L will be described below as an example. As shown in FIG. 2, the suspension mechanism 100L includes a first arm part 110, a second arm part 115, a support shaft 120, a first spring member 130, a second spring member 135, bearings 140, a first damper part 150, and a second damper part 155.

The first arm part 110 is connected to a first axle (not shown) of the first rear wheel 50L, and its longitudinal direction extends in the front-rear direction of the vehicle 1. One end of the first arm part 110 is positioned on the front side of the first rear wheel 50L, and the other end of the first arm part 110 is positioned on the rear side of the axle (not shown) of the first rear wheel 50L, in the front-rear direction.

The second arm part 115 is connected to a second axle (not shown) of the second rear wheel 55L, and its longitudinal direction extends in the front-rear direction of the vehicle 1. One end of the second arm part 115 is positioned on the rear side of the second rear wheel 55L, and the other end of the second arm part 115 is positioned on the front side of the axle (not shown) of the second rear wheel 55L, in the front-rear direction.

The first arm part 110 and the second arm part 115 are made of separate members. Therefore, the first arm part 110 and the second arm part 115 each pivot around the support shaft 120 independently. Further, the first arm part 110 and the second arm part 115 are disposed on an outer side of the side member 12 in the vehicle width direction, along the front-rear direction. Therefore, the floor surface 32 of the load chamber 30 provided on the vehicle body frame 10 can be lowered because the first arm part 110 and the second arm part 115 do not intersect with the side member 12 of the vehicle body frame 10.

The support shaft 120 connects one end of the first arm part 110 and one end of the second arm part 115. The support shaft 120 supports one end of the first arm part 110 in the longitudinal direction and one end of the second arm part 115 in the longitudinal direction, such that both of these one ends are pivotably supported with respect to the vehicle body frame 10. Therefore, the first arm part 110 and the second arm part 115 pivot around the support shaft 120 when an impact is applied to the first rear wheel 50 or the second rear wheel 55. The support shaft 120 is supported by the vehicle body frame 10 (for example, the side member 12).

The first spring member 130 is provided between the other end of the first arm part 110 in the longitudinal direction and the vehicle body. The first spring member 130 is a coil spring in this embodiment. When the first spring member 130 is positioned at the other end of the first arm part 110, a distance between the support shaft 120 positioned at said one end and the first spring member 130 can be increased. In particular, in the present embodiment, since the length of the first arm part 110 is greater than the diameter of the first rear wheel 50, the first spring member 130 can be separated from the support shaft 120 beyond the axle (not shown) of the first rear wheel 50L. In this way, because it is possible to add a lever ratio to the spring constant of the coil spring used as the first spring member 130 to the axle (not shown) of the first rear wheel 50L, the suspension mechanism 100 according to the first embodiment can increase the effective spring constant and withstand heavy loads.

Figures 3, 4A:
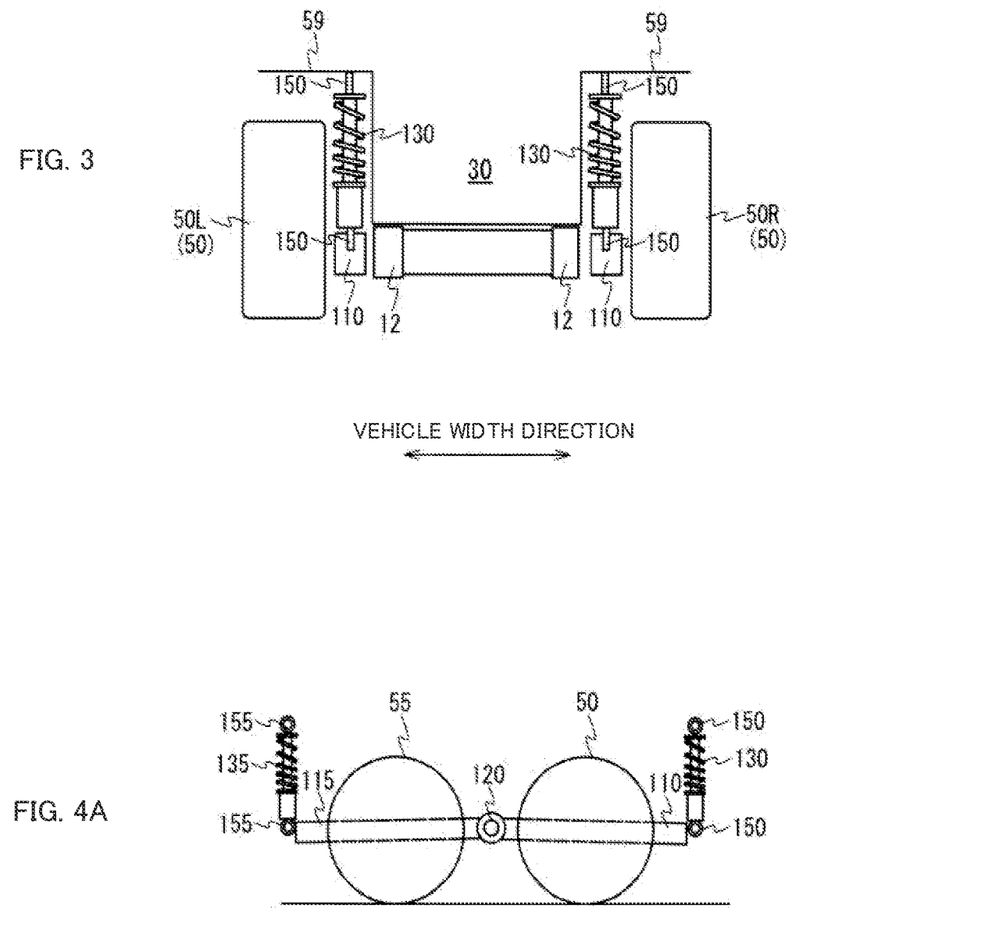
FIG. 3 is a schematic view for illustrating an arrangement of a first spring member 130.
FIG. 4A is a schematic diagram illustrating movement of the first spring member 130 and a second spring member 135.

FIG. 3 is a schematic view for illustrating an arrangement of the first spring member 130. As shown in FIG. 3, the first spring member 130 is disposed along the vertical direction.

One end of the first spring member 130 is positioned on the first arm part 110 side, and the other end of the first spring member 130 is positioned on the vehicle body (specifically, the upper surface 59 of the wheel housing) side.

The second spring member 135 is provided between the other end of the second arm part 115 in the longitudinal direction and the vehicle body. The second spring member 135 is a coil spring in this embodiment. When the second spring member 135 is positioned at the other end of the second arm part 115, a distance between the support shaft 120 positioned at said one end and the second spring member 135 can be increased. In particular, in the present embodiment, since the length of the second arm part 115 is greater than the diameter of the second rear wheel 55, the second spring member 135 can be separated from the support shaft 120 beyond the axle (not shown) of the second rear wheel 55L. In this way, because it is possible to add a lever ratio to the spring constant of the coil spring used as the second spring member 135 to the axle (not shown) of the second rear wheel 55L, the suspension mechanism 100 according to the first embodiment can increase the effective spring constant and withstand heavy loads. In the above description, the first spring member 130 and the second spring member 135 are coil springs, but the embodiment is not limited thereto, and they may be air springs.

Figure 4B:
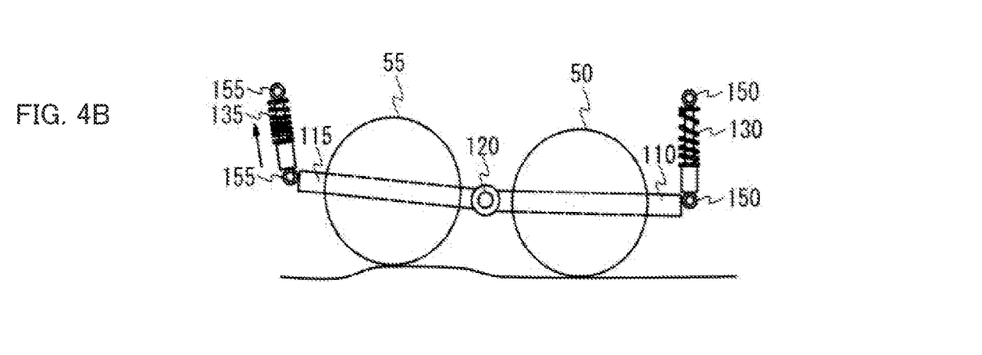
FIG. 4B is a schematic view for explaining the movement of the first spring member 130 and the second spring member 135.

FIGS. 4A and 4B are each a schematic view for explaining movement of the first spring member 130 and the second spring member 135. As shown in FIG. 4A, when the vehicle 1 travels on a flat road surface, the first spring member 130 and the second spring member 135 do not expand or contract. On the other hand, as shown in FIG. 4B, when the second rear wheel 55 rides on a bump on the road surface, the second spring member 135 contracts. As described above, since the first arm part 110 and the second arm part 115 pivot independently, the first spring member 130 does not expand or contract even when the second spring member 135 contracts. In other words, the first spring member 130 and the second spring member 135 expand and contract independently.

The bearings 140 are bearings that support both ends of the support shaft 120. As shown in FIG. 2, the bearings 140 are provided at one end of the first arm 110 and at one end of the second arm 115. Specifically, two bearings 140 are provided at one end of the first arm part 110, and two bearings 140 are provided at one end of the second arm part 115. The two bearings provided at the one end of the first arm part 110 correspond to a pair of first bearings, and the two bearings provided at the one end of the second arm part 115 correspond to a pair of second bearings. Here, since it is assumed that the load acting on the second arm part 115 is large, the bearings 140 provided on the second arm part 115 are positioned on the outer side. In a case where the load acting on the first arm part 110 is large, the bearings 140 provided on the first arm part 110 may be disposed on the outer side.

When the bearings 140 support the support shaft 120, it can resolve an issue that would arise in a case where bushes support the support shaft 120. In the case where the bushes support the support shaft 120, the bushes deflect during turning of the vehicle 1, the rear wheels face outward, and oversteer occurs. In contrast, when the bearings 140 are used, oversteer due to deflection of the bushes can be prevented.

Further, the first arm part 110 and the second arm part 115 can pivot more smoothly in the case where the bearings 140 are used in comparison to the case where the bushes are used. In particular, in the case of a configuration where the first drive motor 52 is disposed in the first rear wheel 50 and the second drive motor 57 is disposed in the second rear wheel 55, movement of the first arm part 110 and the second arm part 115 are prone to deterioration due to a gyro effect caused by high inertia, but the deterioration of the movement of the first arm part 110 and the second arm part 115 can be reduced by employing the bearings 140.

As shown in FIG. 3, the first damper part 150 is disposed so as to penetrate through the first spring member 130 coaxially. The first damper part 150 at one end of the first spring member 130 is bonded to the first arm part 110, and the first damper part 150 at the other end of the first spring member 130 is bonded to the vehicle body (for example, the upper surface 59 of the wheel housing). In a case where a bush is employed at one end of the first arm 110, the first arm part 110 may sway to and fro due to deflection of the bush, compared to the case of using the bearings 140, but swaying of the first arm part 110 can be suppressed by providing the first damper part 150 as in the present embodiment.

Similarly to the first damper part 150, the second damper part 155 is disposed so as to penetrate through the second spring member 135 coaxially. The second damper part 155 at one end of the second spring member 135 is bonded to the second arm part 115, and the second damper part 155 at the other end of the second spring member 135 is bonded to the vehicle body (for example, the upper surface 59 of the wheel housing). Swaying of the second arm part 115 can be suppressed by providing the second damper part 155, in a similar manner as with the first damper part 150.

By employing the above-mentioned suspension mechanism 100 which is the independent suspension, it is possible to arrange a battery, an inverter, or the like under the load chamber 30, while realizing low flooring in the load chamber 30, for example. In FIG. 2, a battery 190 for supplying electric power to the first drive motor 52 and the second drive motor 57 (FIG. 1) is positioned between the suspension mechanism 100L and the suspension mechanism 100R in the vehicle width direction. As described above, since there is no member intersecting the side members 12 of the vehicle body frame 10, it is possible to dispose a large battery 190 between the pair of the side members 12.

Second Embodiment

Figure 5:
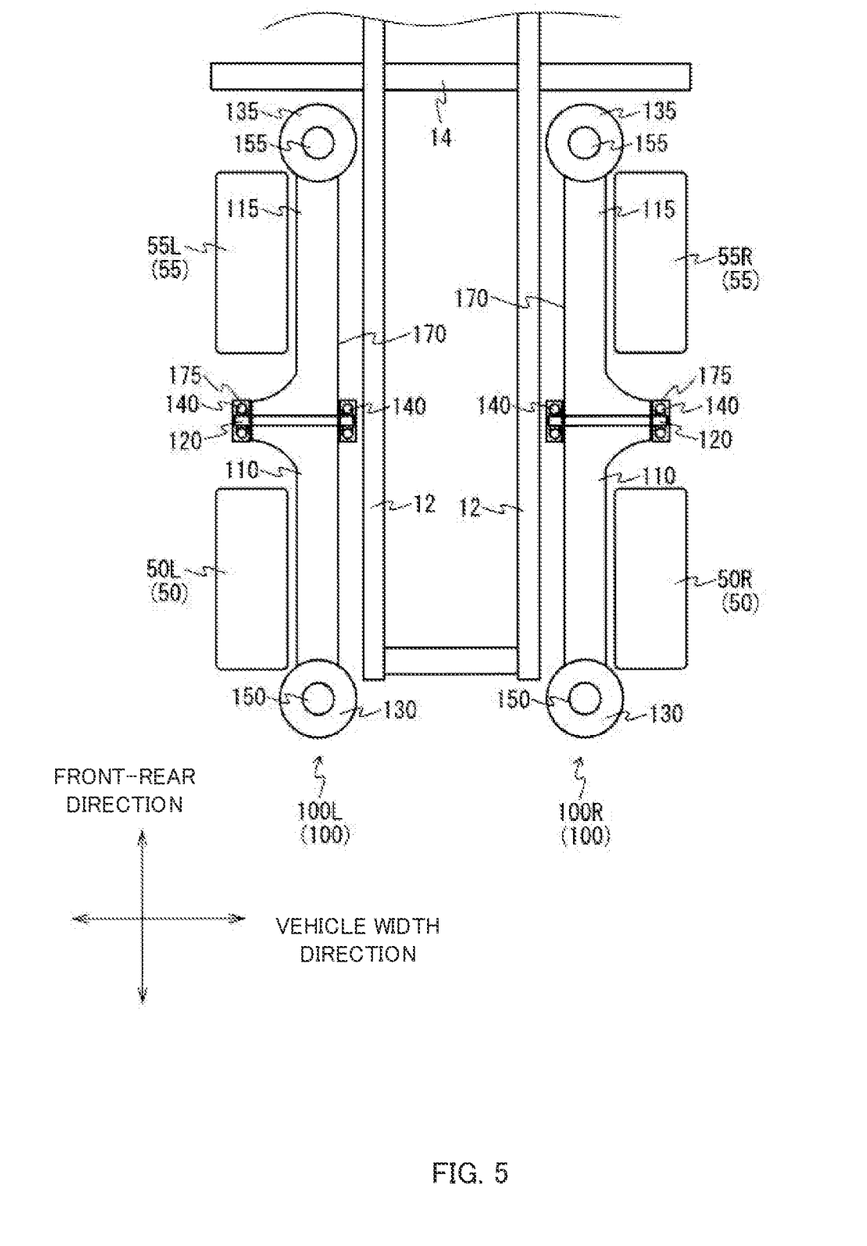
FIG. 5 is a schematic diagram illustrating a configuration of a suspension mechanism 100 according to a second embodiment.

FIG. 5 is a schematic diagram illustrating a configuration of a suspension mechanism 100 according to the second embodiment. The configurations of the first arm part 110, the second arm part 115, and the support shaft 120 of the second embodiment differ from those of the first embodiment. Since other configurations are the same as those of the first embodiment, a detailed description thereof is omitted.

In the first embodiment, the first arm part 110 and the second arm part 115 are separate members and each pivot independently around the support shaft 120. In the second embodiment, the first arm part 110 and the second arm part 115 each form a part of an arm member 170. The support shaft 120 supports the center of the arm member 170. Therefore, the first arm part 110 and the second arm part 115 pivot around the support shaft 120 integrally in the second embodiment.

The support shaft 120 according to the second embodiment is provided on a bracket 175 fixed to the vehicle body frame 10 (for example, the side member 12). Since the first arm part 110 and the second arm part 115 are integrated, the arm member 170 is supported only with two support shafts 120 in the second embodiment.

Figure 6A:
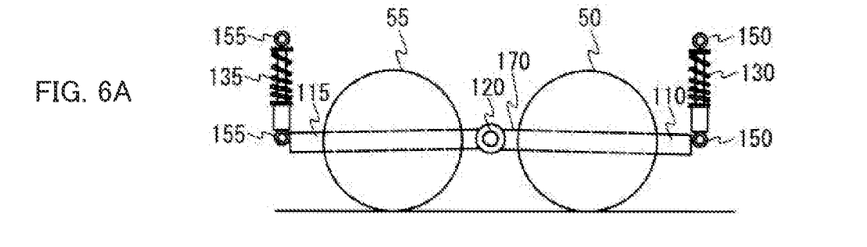
FIG. 6A is a schematic diagram illustrating movement of the first spring member 130 and the second spring member 135.
Figure 6B:
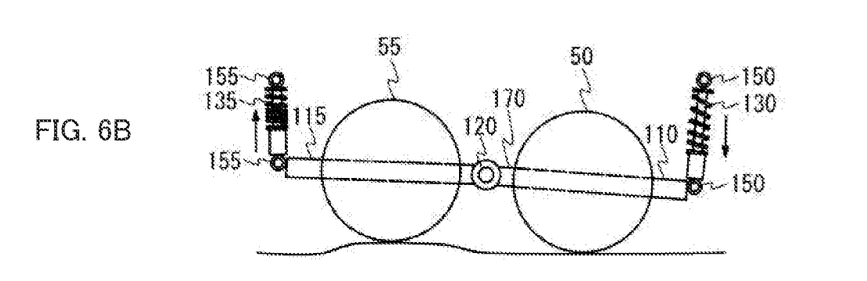
FIG. 6B is a schematic diagram illustrating movement of the first spring member 130 and the second spring member 135.

FIGS. 6A and 6B are each a schematic view for explaining movement of the first spring member 130 and the second spring member 135. As shown in FIG. 6A, when the vehicle 1 travels on a flat road surface, the first spring member 130 and the second spring member 135 do not expand or contract. On the other hand, as shown in FIG. 6B, when the second rear wheel 55 rides on a bump on the road surface, the second spring member 135 contracts. Since the first arm part 110 and the second arm part 115 pivot integrally, when the first spring member 130 contracts, the second spring member 135 extends.

<Effects of the Present Embodiment>

The suspension mechanism 100 (100L, 100R) of the embodiment described above is an independent suspension, and includes the first arm part 110 and the second arm part 115 extending in the front-rear direction, the support shaft 120 that supports one end of the first arm part 110 and one end of the second arm part 115, the first spring member 130 that is provided between the other end of the first arm part 110 and the vehicle body, and the second spring member 135 that is provided between the other end of the second arm part 115 and the vehicle body. By doing this, since the first arm part 110 and the second arm part 115 do not intersect the side members 12 of the vehicle body frame 10, low flooring in the load chamber 30 can be realized. Further, since the first spring member 130 and the second spring member 135 are disposed at positions away from the support shaft 120, a lever ratio can be added to the spring constants of the first spring member 130 and the second spring member 135, thereby increasing the effective spring constant and enabling them to withstand heavy loads of vehicles with the high gross vehicle weight.

The present disclosure is explained based on the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

DESCRIPTION OF SYMBOLS

1 Vehicle
10 Body frame
30 Load chamber
50 First rear wheel
52 First drive motor
55 Second rear wheel
57 Second drive motor
100 Suspension mechanism
110 First arm part
115 Second arm part
120 Support shaft
130 First spring member
135 Second spring member
140 Bearing
150 First damper part
155 Second damper part

The invention claimed is:
1. A vehicle in which a load chamber is provided on a vehicle body frame, the vehicle comprising:

at least four drive motors, a drive motor for each wheel of a pair of first rear wheels and a pair of second rear wheels, disposed having a predetermined interval therebetween in a front-rear direction of the vehicle, and rotates the first rear wheels and the second rear wheels independently;

a pair of suspension mechanisms that support a first axle of the first rear wheels and a second axle of the second rear wheels, wherein each suspension mechanism includes:
- a first arm part, connected to the first axle of the first rear wheel, whose longitudinal direction extends in the front-rear direction,
- a second arm part, connected to the second axle of the second rear wheel, whose longitudinal direction extends in the front-rear direction,
- a support shaft that supports one end of the first arm part in the longitudinal direction and one end of the second arm part in the longitudinal direction such that both of the one ends are pivotably supported with respect to the vehicle body frame,
- a first spring member provided between the other end of the first arm part in the longitudinal direction and a vehicle body, and
- a second spring member provided between the other end of the second arm part in the longitudinal direction and the vehicle body;

a pair of first bearings that are provided on the one end of the first arm part, and support both ends of the support shaft; and a pair of second bearings that are provided on the one end of the second arm part, and support both ends of the support shaft.

2. The vehicle according to claim 1, wherein
the support shaft connects the one end of the first arm part and the one end of the second arm part, and
the first arm part and the second arm part each pivot around the support shaft independently.

3. The vehicle according to claim 1, further comprising:
an arm member in which the first arm part and the second arm part are integrated, wherein the support shaft supports a center of the arm member in the longitudinal direction, and the first arm part and the second arm part pivot around the support shaft integrally.

4. The vehicle according to claim 1, wherein
a length of the first arm part in the longitudinal direction is greater than a diameter of the first rear wheel,
a length of the second arm part in the longitudinal direction is greater than a diameter of the second rear wheel, and
the first spring member and the second spring member are coil springs disposed along a vertical direction.

5. The vehicle according to claim 1, wherein the suspension mechanism further includes:
a first damper part that bonds ends of the first spring member respectively to the other end of the first arm part and to the vehicle body, and
a second damper part that bonds ends of the second spring member respectively to the other end of the second arm part and to the vehicle body.

6. The vehicle according to claim 1, wherein
a floor surface of the load chamber is lower than a center of the first rear wheel and the second rear wheel in the vertical direction and is positioned between the pair of suspension mechanisms in the vehicle width direction.

7. The vehicle according to claim 2, wherein
the first arm part and the second arm part pivot around the support shaft independently such that only one of the first spring member and the second spring member expands or contracts.

8. The vehicle according to claim 3, wherein
the first arm part and the second arm part pivot around the support shaft integrally such that both the first spring member and the second spring member expand and contract together.

9. The vehicle according to claim 1, wherein
the body frame includes a pair of side members that extend in the front-rear direction of the vehicle,
the first arm part and the second arm part are disposed on outer sides of the side members in the vehicle width direction, along the front-rear direction, and
the vehicle further comprises a battery that supplies electric power to the at least four drive motors, wherein the battery is positioned between the pair of side members.

* * * * *